United States Patent
Mashiah

(10) Patent No.: US 8,947,502 B2
(45) Date of Patent: Feb. 3, 2015

(54) IN CAMERA IMPLEMENTATION OF SELECTING AND STITCHING FRAMES FOR PANORAMIC IMAGERY

(75) Inventor: Ayelet Mashiah, Haifa (IL)

(73) Assignee: Qualcomm Technologies, Inc., San Diego, CA (US)

( * ) Notice: Subject to any disclaimer, the term of this patent is extended or adjusted under 35 U.S.C. 154(b) by 304 days.

(21) Appl. No.: 13/359,303

(22) Filed: Jan. 26, 2012

(65) Prior Publication Data

US 2013/0038680 A1 Feb. 14, 2013

Related U.S. Application Data

(60) Provisional application No. 61/472,454, filed on Apr. 6, 2011.

(51) Int. Cl.
*H04N 5/225* (2006.01)
*H04N 5/232* (2006.01)
(Continued)

(52) U.S. Cl.
CPC ............ *H04N 5/23238* (2013.01); *H04N 5/225* (2013.01); *G06T 3/4038* (2013.01); *G06T 7/204* (2013.01); *G06T 2207/10016* (2013.01); *G06T 2207/20021* (2013.01)
USPC ............................ 348/36; 715/201; 348/231.3

(58) Field of Classification Search
CPC ........... G06K 9/36; H04N 5/225; H04N 7/00; H04N 5/23238; H04N 5/2628; H04N 5/2259; H04N 9/74; G06T 3/4038; G02B 13/06
USPC ........ 348/36, E05.024, 231.3, 218.1, 584, 39, 348/231.2, 173, 171, 37, 207.99; 382/284, 382/286, 162; 275/240.08; 345/629, 427; 375/240.12, 240.18
See application file for complete search history.

(56) References Cited

U.S. PATENT DOCUMENTS 6,002,430 A * 12/1999 McCall et al. ........... 348/207.99
6,023,588 A 2/2000 Ray et al.
(Continued)

FOREIGN PATENT DOCUMENTS

EP 2242252 A2 10/2010
WO 2008004150 A2 1/2008

OTHER PUBLICATIONS

Search Report for British Patent Application No. GB1205402.9 dated Jul. 24, 2012.
(Continued)

*Primary Examiner* — Dave Czekaj
*Assistant Examiner* — Dramos I Kalapodas
(74) *Attorney, Agent, or Firm* — Knobbe, Martens, Olson & Bear, LLP

(57) ABSTRACT

A system, method, and computer program product for selecting qualifying frames from an image sequence for use in subsequent stitching into a composite panoramic image are disclosed. Incoming frames from any source may be cropped and downscaled prior to evaluation against qualifying criteria relating to image overlap and local motion. Qualifying images are saved and/or output. The resulting panoramic image generally uses fewer qualifying images and appears smoother and has fewer artifacts than those of the prior art. The qualifying criterion for image overlap is a predetermined overlap margin or percentage between a current image and a previous image from the sequence. The qualifying criterion for image motion includes a maximum amount of local motion, often due to passing objects. The embodiments may process incoming images in real time or from stored sequences. Problems may trigger user warnings.

25 Claims, 3 Drawing Sheets

(51) Int. Cl.
*G06T 3/40* (2006.01)
*G06T 7/20* (2006.01)
G06F 17/00 (2006.01)
H04N 5/76 (2006.01)

(56) References Cited

U.S. PATENT DOCUMENTS

| | | | |
|---|---|---|---|
| 6,075,905 A | 6/2000 | Herman et al. | |
| 6,331,869 B1 * | 12/2001 | Furlan et al. | 348/36 |
| 6,671,400 B1 * | 12/2003 | Ekpar et al. | 382/157 |
| 6,677,981 B1 * | 1/2004 | Mancuso et al. | 348/36 |
| 6,717,608 B1 * | 4/2004 | Mancuso et al. | 348/36 |
| 6,731,305 B1 | 5/2004 | Park et al. | |
| 6,771,304 B1 | 8/2004 | Mancuso et al. | |
| 6,785,427 B1 | 8/2004 | Zhou | |
| 6,834,128 B1 | 12/2004 | Altunbasak et al. | |
| 6,885,392 B1 | 4/2005 | Mancuso et al. | |
| 6,930,703 B1 | 8/2005 | Hubel et al. | |
| 7,064,783 B2 * | 6/2006 | Colavin et al. | 348/231.3 |
| 7,197,192 B2 | 3/2007 | Edwards | |
| 7,289,147 B2 | 10/2007 | Webb | |
| 7,373,017 B2 | 5/2008 | Edwards et al. | |
| 7,375,745 B2 | 5/2008 | Rai et al. | |
| 7,424,218 B2 | 9/2008 | Baudisch et al. | |
| 7,460,730 B2 | 12/2008 | Pal et al. | |
| 7,480,001 B2 * | 1/2009 | Endler et al. | 348/333.01 |
| 7,639,897 B2 | 12/2009 | Gennetten et al. | |
| 7,656,429 B2 | 2/2010 | Larson | |
| 7,711,262 B2 | 5/2010 | Park et al. | |
| 7,746,375 B2 | 6/2010 | Ketelaars et al. | |
| 7,746,404 B2 | 6/2010 | Deng et al. | |
| 7,860,343 B2 | 12/2010 | Tico et al. | |
| 7,965,332 B2 | 6/2011 | Chiu et al. | |
| 8,279,288 B2 | 10/2012 | Son et al. | |
| 8,350,892 B2 | 1/2013 | Hayashi | |
| 2001/0030693 A1 | 10/2001 | Fisher et al. | |
| 2003/0063816 A1 | 4/2003 | Chen et al. | |
| 2003/0103683 A1 | 6/2003 | Horie | |
| 2004/0027451 A1 * | 2/2004 | Baker | 348/46 |
| 2004/0189849 A1 | 9/2004 | Hofer | |
| 2004/0201755 A1 | 10/2004 | Norskog | |
| 2005/0089244 A1 | 4/2005 | Jin et al. | |
| 2005/0168594 A1 * | 8/2005 | Larson | 348/222.1 |
| 2006/0050152 A1 | 3/2006 | Rai et al. | |
| 2006/0182437 A1 | 8/2006 | Williams et al. | |
| 2007/0025723 A1 | 2/2007 | Baudisch et al. | |
| 2007/0031062 A1 * | 2/2007 | Pal et al. | 382/284 |
| 2007/0081081 A1 | 4/2007 | Cheng | |
| 2007/0109398 A1 * | 5/2007 | Teo | 348/36 |
| 2007/0237423 A1 | 10/2007 | Tico et al. | |
| 2008/0043093 A1 | 2/2008 | Song | |
| 2008/0056612 A1 | 3/2008 | Park et al. | |
| 2008/0062254 A1 | 3/2008 | Edwards et al. | |
| 2008/0074489 A1 | 3/2008 | Zhang et al. | |
| 2008/0074506 A1 | 3/2008 | Oh et al. | |
| 2008/0158342 A1 | 7/2008 | Jeong et al. | |
| 2008/0159653 A1 | 7/2008 | Dunki-Jacobs et al. | |
| 2008/0170803 A1 | 7/2008 | Forutanpour | |
| 2008/0291288 A1 | 11/2008 | Tzur et al. | |
| 2009/0028462 A1 | 1/2009 | Habuka et al. | |
| 2009/0058988 A1 * | 3/2009 | Strzempko et al. | 348/36 |
| 2009/0208062 A1 | 8/2009 | Sorek et al. | |
| 2010/0020190 A1 | 1/2010 | Kawakatsu et al. | |
| 2010/0033553 A1 | 2/2010 | Levy | |
| 2010/0054628 A1 | 3/2010 | Levy et al. | |
| 2010/0265313 A1 | 10/2010 | Liu et al. | |
| 2012/0177253 A1 | 7/2012 | Tseng et al. | |
| 2013/0124951 A1 * | 5/2013 | Shechtman et al. | 715/201 |

OTHER PUBLICATIONS

Official Communication for U.S. Appl. No. 12/536,728 mailed Nov. 2, 2012.

Official Communication for U.S. Appl. No. 12/536,728 mailed Feb. 27, 2013.

Official Communication for U.S. Appl. No. 12/549,254 mailed Oct. 19, 2012.

Official Communication for U.S. Appl. No. 12/549,254 mailed Mar. 4, 2013.

Official Communication for U.S. Appl. No. 12/549,254, mailed Jun. 10, 2013.

International Search Report and Written Opinion for International Patent Application No. PCT/US2009/053151 issued Sep. 18, 2009.

International Search Report and Written Opinion for International Patent Application No. PCT/US2009/055265 mailed Oct. 15, 2009.

Fischler, M. A. et al., "Random Sample Consensus: A Paradigm for Model Fitting with Applications to Image Analysis and Automated Cartography," Communications of the ACM, vol. 24, No. 6, Jun. 1981, pp. 381-395.

Ha, S. J. et al., "Panorama Mosaic Optimization for Mobile Camera Systems," IEEE Transactions on Consumer Electronics, vol. 53, No. 4, Nov. 2007. pp. 1217-1225.

Migram, D. L., "Adaptive Techniques for Photomosaicking," IEEE Transactions on Computers, vol. C-25, No. 11, Nov. 19787, pp. 1175-1180.

Migram, D. L., "Computer Methods for Creating Photomosaics," IEEE Transactions on Computers, vol. C-24, No. 11, Nov. 1975, pp. 1113-1119.

Milgram, D.L., "Computer Methods for Creating Photomosaics," IEEE Transactions on Computers, Nov. 1975, vol. C-24, No. 11, pp. 1113-1119.

Milgram, D.L., "Adaptive Techniques for Photomosaicking", IEEE Transactions on Computers, Nov. 1977; vol. C-25, No. 11, pp. 1175-1180.

* cited by examiner

US 8,947,502 B2

IN CAMERA IMPLEMENTATION OF SELECTING AND STITCHING FRAMES FOR PANORAMIC IMAGERY

CROSS REFERENCE TO RELATED APPLICATIONS

This application is based upon and claims the benefit under 35 U.S.C. 119(e) of commonly-assigned U.S. provisional application Ser. No. 61/472,454, filed Apr. 6, 2011, and entitled "In Camera Implementation of Selecting and Stitching Frames for Panoramic Imagery", which is hereby incorporated by reference. Commonly-assigned patent applications of related subject matter include U.S. Ser. No. 12/536,728, filed on Aug. 6, 2009, entitled "In-Camera Panorama Image Stitching Assistance", published Feb. 11, 2010 as U.S. Patent Application Publication 2010/0033553A1, and U.S. Ser. No. 12/549,254, filed on Aug. 27, 2009, entitled "Robust Fast Panorama Stitching In Mobile Phones Or Cameras", published Mar. 4, 2010 as U.S. Patent Application Publication 2010/0054628A1, each of which is also expressly incorporated by reference in its entirety.

FIELD OF THE INVENTION

This patent application relates in general to stitching a sequence of images from a digital camera together to create a single composite panoramic image, and more specifically to capturing the images to increase the likelihood of achieving a quality panoramic image.

BACKGROUND OF THE INVENTION

Panoramic or wide format photography captures a sequence of images that are reconstructed into a single image that takes the form of a wide strip with an elongated field of view. A panoramic image typically shows a field of view that is greater than that of a camera equipped with a wide angle lens. One way to capture a panoramic image is to mount a film camera on a tripod and take a succession of images of a scene as the camera is physically rotated. The images are subsequently "stitched" together by physically cutting and pasting together strips of exposed film where the boundaries between the edges of the film are carefully aligned.

Recently, the benefits of electronic photography have led to the general acceptance of digital cameras, that store captured images in a digital memory. Some digital cameras also provide a "panorama" feature that allows a user of the digital camera to capture a sequence of adjacent images that are subsequently digitally "stitched" together into a single image with a wide coverage of field. For example, some digital cameras with a panoramic feature can interface with a personal computer that provides software to externally join together two or more images at their edge boundaries to generate a single image with a wide panoramic format.

Two basic types of panoramic image assembly solutions for consumer-level cameras can be found in the market today. One is based on an "assist" application and the other is based on a sweep hand motion. In the assist based solution, the user is required to manually take the images after deciding, with the aid of an assistant application, that the proper overlap between images has been achieved. This flow leaves the decision of which pictures to capture for panorama image production to the user. For example, as described in commonly-assigned U.S. Patent Application Publication 2010/0033553, the existing solution for creating a panoramic image requires the user to take a few images with proper overlap (the user is guided by the camera with an assist application to take the pictures with the proper overlap) and then these images are stitched together into a panoramic image. This is a cumbersome process for the user and it might also result in failure to stitch the images for several reasons. First, the overlap between the images might not be within the required margins. Second, the scene may change while taking consecutive images; for example, lighting conditions may change, or object motion may be introduced.

Newer cameras in the market provide a feature where, for example, by pressing a button and sweeping the camera across the scene, images with proper overlap are captured automatically. Some cameras may capture images until the pressed button is released, or until a memory is full, or an overall image of predetermined size is captured, or a predetermined number of pictures are captured, or the sweep motion is ended, etc. A panoramic view is then created using the captured images. However, as shown by experimentation, this flow may produce unsatisfactory results when there is large local motion (e.g. passing cars, pedestrians, or animals) in the sequence of captured images. Some of the solutions that can be found in the market compose the panorama by stitching together narrow stripes from a large number of images from the capture sequence. A less desirable panoramic image having a stripe-like appearance sometimes results.

This patent application describes a solution to these challenges.

SUMMARY OF THE EMBODIMENTS

Systems, methods, and computer program products for selecting qualifying frames from an image sequence for use in subsequent stitching into a composite panoramic image are disclosed and claimed herein.

As described more fully below, the apparatus and processes of the embodiments disclosed permit production of improved panoramic images. Further aspects, objects, desirable features, and advantages of the apparatus and methods disclosed herein will be better understood and apparent to one skilled in the relevant art in view of the detailed description and drawings that follow, in which various embodiments are illustrated by way of example. It is to be expressly understood, however, that the drawings are for the purpose of illustration only and are not intended as a definition of the limits of the claimed invention.

Describing the present invention in terms of an exemplary method embodiment, at least some of the frames of an image sequence are chosen to be processed to select particular qualifying images to be used in production of a panoramic composite image. Frame overlap constraints are evaluated, and those frames meeting those constraints are also evaluated on frame motion constraints. Qualifying frames meeting all the constraints are selectively saved and outputted.

The method may operate in real time, and may process all the frames of an image sequence in order. The frames may be downscaled and cropped. The image sequence may be processed during image sequence capture or after image sequence capture. The image sequence may comprise any set of frames captured in succession, such as an uncompressed or compressed video sequence, and may be acquired by a digital camera during a pan of a target scene.

A count of frames required for production of a composite panoramic image may be specified. The frame overlap constraints may comprise a specified directional overlap percentage with respect to a previous qualifying frame. For example, the specified directional overlap percentage may be at least a forty percent horizontal overlap. The frame motion constraints comprise a maximum allowable local motion within a frame overlap region. The frame motion constraints may be evaluated by first performing motion estimation of a current frame with respect to a previous frame, then dividing overlapping frame regions into blocks, summing the number of pixels in each block wherein the difference in pixel illumination values for the current frame and the previous frame exceeds a predefined threshold, and finally selectively determining that large local motion violates the frame motion constraints according to the percentage of blocks having a high value for the pixels with high illumination value differences.

The first frame in the image sequence may be saved and outputted as a qualifying frame by default. Qualifying frames may be retained for further use as reference frames during further processing of the image sequence. The embodiments may stitch the qualifying frames into a composite panoramic image for output and storage.

Users may be warned if an error condition occurs, including for example if frame motion constraints are violated, frame overlap constraints are violated, excess camera tilt occurs in any orientation, or insufficient qualifying frames are saved. Frame motion constraint violations may include excess local motion, excess or insufficient panning speed, or excess hand motion drift in a perpendicular direction to the sweep direction.

In one embodiment, frame overlap constraints for at least two particular frames of the image sequence are evaluated against a predefined overlap margin, and local motion within the frames is evaluated for the at least two particular frames and at least one additional frame of the image sequence within the predefined overlap margin.

DETAILED DESCRIPTION OF EXEMPLARY EMBODIMENTS

Figure 1:
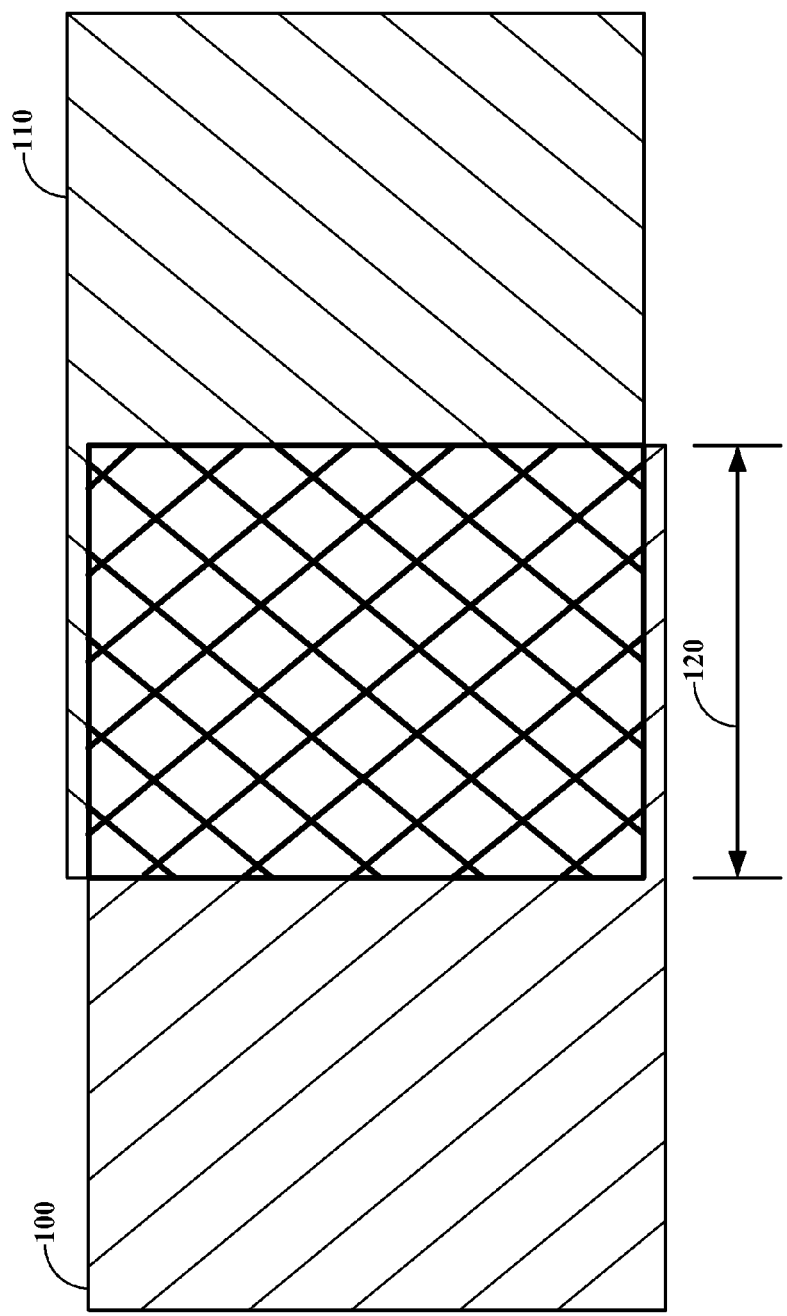
FIG. 1 depicts a diagram of overlapping image frames according to an embodiment.

Embodiments of the present invention require the photographer to sweep or pan the camera across the scene to be photographed. During this time, the camera captures what is essentially a video sequence, i.e. a set of periodically or approximately periodically captured image frames each spanning part of the scene. Individual chosen images of the sequence (i.e. at least some, but preferably all images are chosen) are then reviewed by an algorithm that checks to determine whether they comply with a set of requirements to ensure that the chosen images qualify to contribute to a good final panoramic image. The requirements are as follows: proper image overlap and no local motion. Each qualifying image in the video sequence that complies with those requirements is saved to memory, to be used later in the stitching stage. A log of the overlap of each qualifying image with the previous qualifying image is also kept. This data is useful in the stitching stage, where the qualifying images are combined seamlessly to create one panoramic image.

The stitching stage currently employed is described in commonly-assigned U.S. Patent Application Publication 2010/0054628, although the present invention is not limited to this particular stitching method. In this method, the transformation between every consecutive pair of images needs to be found. The log kept of the image overlap is used as an initial hint for this transformation.

The embodiments of the present invention offer an automatic real-time decision process that checks each chosen incoming frame to determine whether it is suitable for use in the final panoramic image. This process may be used with any camera or other imaging device. A subsequent stitching stage concatenates the qualifying images (or portions thereof) together to create the panoramic image.

By using significantly fewer images to create the panoramic image than in some prior art references, there is a significant reduction in "stripiness" of the panoramic image, so it appears to be smoother and of higher output quality. Furthermore, the embodiments enable a more reliable and accessible operation of the commonly-assigned panoramic image production methods.

This patent application thus describes a methodology for choosing the most suitable frames, from a stream of video frames arriving sequentially, for creating a panoramic image. At the end of the process, several overlapping images that include no local motion or only minimal local motion are saved. Each chosen captured image is downscaled and registered against the previous chosen image. It is also analyzed for local motion in the frame by comparing the current image to the previous chosen image. If the image is within the required overlap range with the previous chosen image and the local motion is small, it is saved for further processing; otherwise, it is discarded. Local motion is only important in overlapping areas, so in an alternate embodiment overlapping area local motion serves as a criterion for image qualification, along with proper overlap range.

Referring now to FIG. 1, two chosen image frames 100 and 110 are shown. These image frames have an overlapping region 120. In this exemplary figure, the panorama is shown with a horizontal orientation, but the invention is not limited to any particular orientation or direction.

Figure 2:
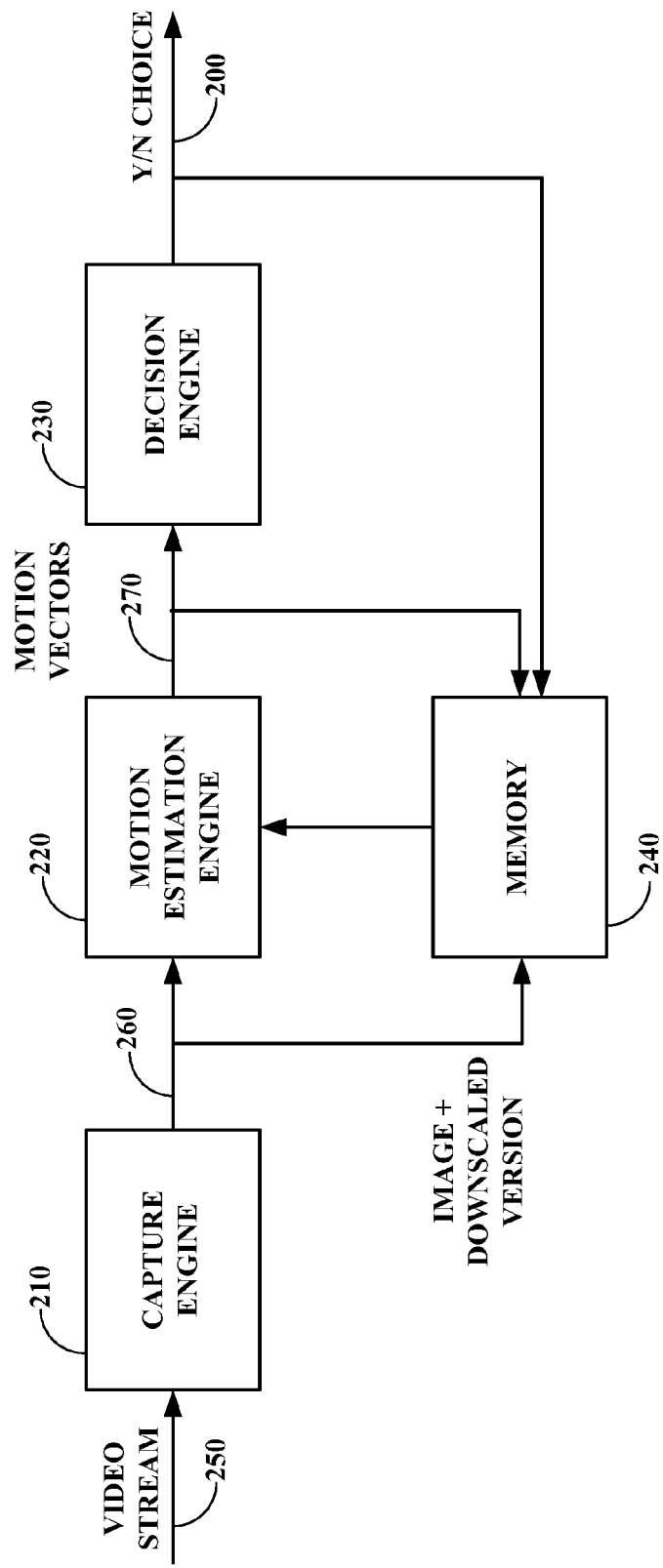
FIG. 2 depicts a diagram of a system implementation according to an embodiment.

Referring now to FIG. 2, a system diagram is provided that depicts the basics of the embodiments of the present invention that operate on chosen incoming video frames and output related keep/discard decisions and kept qualifying frames. A capture engine 210 receives at each cycle one image 250 as an input, typically from an imaging device such as a digital camera. For each input frame, the capture engine 210 downscales an image, and saves both the image and its downscaled version 260 to memory 240. The downscaled image 260 is fed into a motion estimation engine 220 that evaluates the motion vectors 270 of the image, using a reference image from the memory 240. A decision engine 230, estimates whether the frame overlap is within the required overlap margins and whether the local motion is small enough, and responsively makes a choice whether the current image should be saved as qualifying for the panoramic image or should be discarded. If it is kept, it may become the reference frame for the consecutive frames. The data regarding the resulting overlap between the current image and the previous saved image is passed to the stitching phase, where this data is helpful for determining placement of the qualifying images in the panoramic image.

The decision process performed by the decision engine 230 uses the following two basic rules: (a) if the overlap with the last chosen frame is between the required margins, check for local motion (compared with the previous chosen frame) in the overlap area, and, (b) if the local motion is low, keep the frame as it qualifies for panoramic stitching. Alternate embodiments may also "hold" frames meeting the frame overlap requirements but not the local motion requirements as candidate frames for use in panoramic stitching if no subsequent fully-qualifying candidate frames are captured. The "held" frames may be discarded if a subsequent frame is captured that meets all the qualifying requirements.

Qualifying frames are retained for further use as reference frames; otherwise, the process may discard the non-qualifying current frame and checks the next chosen frame to be processed, which is preferably the next frame in the image sequence. This automated process uses significant portions of a captured image, according to a minimum threshold value, and thereby reduces the number of stitches required to generate a full panoramic image. Also, a higher quality panoramic image is achieved by avoiding the need for the user to provide guidance in capturing the sequence of images. Hence the embodiments of the present invention overcome several deficiencies of the prior art described above, e.g. image quality reduction due to use of a large number of stitches is avoided, complexity of use is greatly reduced, stitching related failures caused by insufficient alignment are greatly reduced, and the effects of local motion within the panoramic image are substantially eliminated.

Following is a description of the overall methodology used in the embodiments of the present invention. Streaming video input may arrive at any rate, generally higher than 10 frames per second, typically 30 frames per second, and at any resolution. The algorithm may be configured with the following parameters:

1. The part of the incoming picture to be used—the incoming pictures may be used as a whole or may be cropped to a smaller size.

2. The amount of desired overlap between two images in the panoramic image.

3. The number of images that will comprise the panoramic image.

For example, in an embodiment of the invention one may decide to use only the middle portion of every frame (that may be 50% of the entire frame), with an overlap of 50% between the chosen half-frames. In this example, the required total overlap of a frame with a previous chosen frame is thus 75%. Therefore, using the aforementioned exemplary values, if a 1280×720 pixel video stream is used, once the current frame is shifted 1280×0.25=320 pixels horizontally with respect to a previous chosen frame, the current frame is saved. This saved frame may now become the reference chosen frame. In another embodiment, and not by way of limitation, one can require 25% overlap between the half-frames, and then the required overlap between chosen frames is 37.5%. The embodiments, with these exemplary settings, overcome the significant problem of local motion seen in prior art panoramic image solutions.

Figure 3:
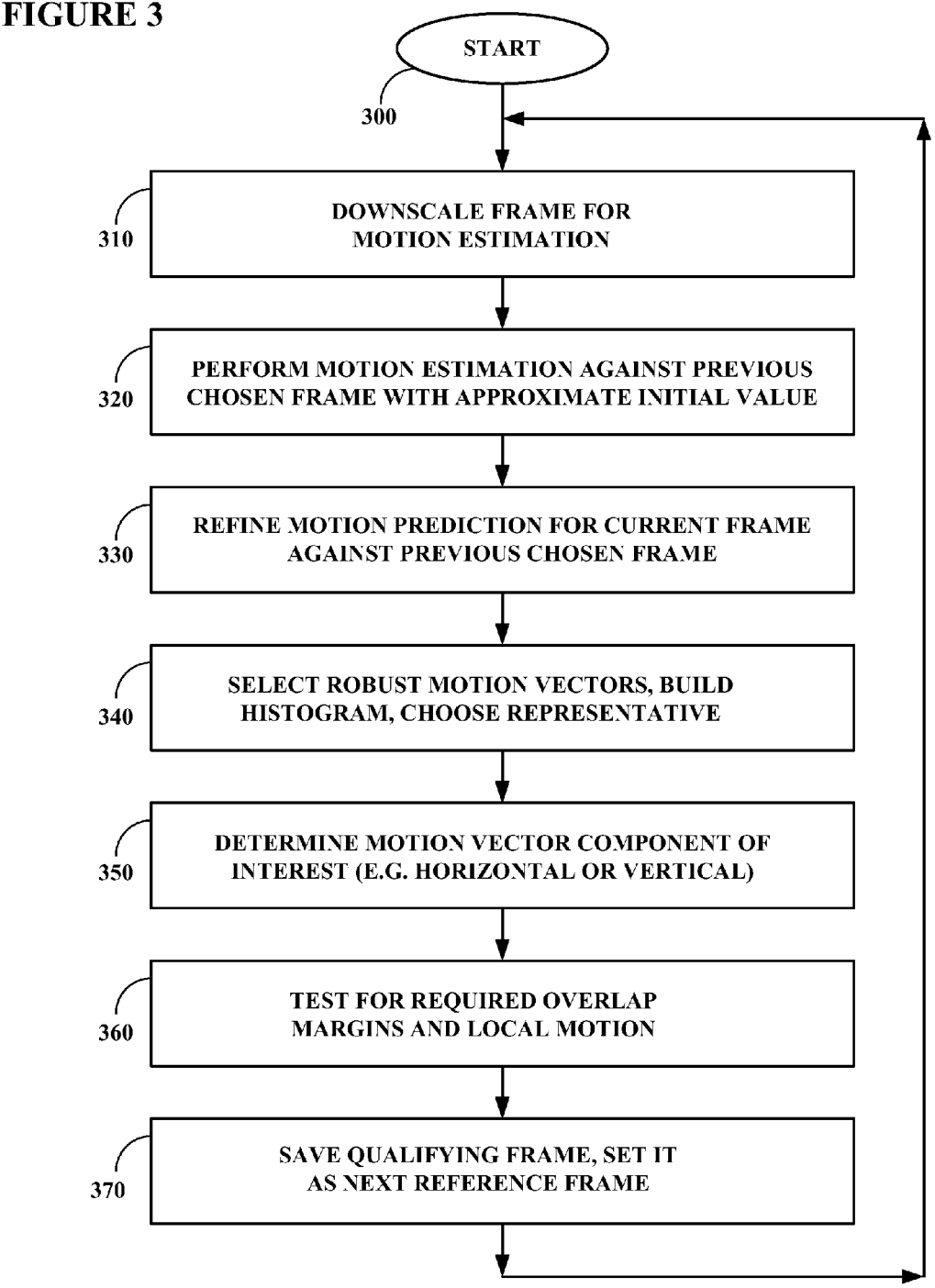
FIG. 3 depicts a diagram of a method implementation according to an embodiment.

Referring now to FIG. 3, in order to identify the frame with correct overlap with respect to the previous chosen frame, the following steps are performed preferably but not necessarily for each incoming frame:

In step 310 the frame is downscaled for motion estimation. This allows finding a large movement along the motion axis (X in case of horizontal motion, and Y in case of vertical motion) with shorter computation time.

In step 320, motion estimation (ME) with respect to the previous chosen frame is then performed. In order to avoid accumulation of ME errors, the ME is performed with respect to the previous chosen frame (rather than the immediately previous frame in the video stream, necessarily) with an initial prediction of the motion. So, the embodiments only find and correct the error in the prediction. The prediction of the motion of the current frame is calculated as the motion of the immediately previous frame with respect to the previous chosen frame, with an addition of a motion prediction of the step from the immediately previous frame to the current frame. The predicted motion is assumed to be the same as the motion between the two previous frames.

In step 330, after the error in the prediction is calculated, this value is added to the prediction, to produce the correct motion of the current frame with respect to the previous chosen frame.

In step 340, the output of the ME prediction is a few hundreds of motion vectors (MVs). The robust MVs are chosen from this pool. Then a 2D histogram of these MVs is created. A single MV is chosen for each frame as the one that corresponds to the largest bin in the histogram. Additional rules are applied to this MV, such as, if a few MVs with similar directions have very high histogram values, then a single MV is calculated as a weighted sum of these.

In step 350, in case of horizontal motion, the only component typically of interest is the X component of the MV (the Y component is used as an indicator of an unwanted perpendicular drift, which is used to warn the user to correct the user's hand motion). The X motion indicates when a frame has been reached that has the desired overlap with a previous chosen frame.

In step 360, if the required overlap margins have been reached, the frame is tested for local motion. By using the difference between the calculated MVs of the current and the previous frames, their overlapping regions are found and registered. The images are divided to corresponding blocks for analysis, and in each block the illumination values of the two images are subtracted, and the number of pixels in each block with a difference in pixel illumination value for the two images exceeding a predefined threshold are summed. If a large percentage of the blocks have a high value for the number of pixels with high illumination value differences, it is assumed that the frame contains large local motion. Such a frame is then preferably discarded and processing continues with the next frame (i.e., with step 310, using the next frame). Otherwise execution of the algorithm continues with step 370 described below. An exception to this phase occurs if the far end of the overlap margins has been reached. In this case, the current frame is used for further processing despite local motion. Subsequently the processing continues with step 310, using the next frame.

In step 370, if the frame complies with the requirements, the frame is saved for further processing. The reference frame is replaced by this frame and processing continues with step 310, using the next frame.

Execution of this algorithm is repeated until the entire panoramic view is captured as may be desired by the user of the capture device. The photographer may be warned if problems occur, for example, if frame motion constraints are violated, frame overlap constraints are violated, excess camera tilt occurs in any orientation, and/or insufficient qualifying frames are saved. The frame motion constraints may be violated by, for example, excess local motion, excess or insufficient panning speed, and/or excess hand motion drift in a perpendicular direction to the sweep direction. Appropriate user messages may be generated as a result of such problems.

One possible alternative is to try and cope with local motion in the frames in the stitching stage (i.e. local motion in the overlap area between pictures will introduce a visual artifact to the final result). In the stitching stage it is possible to attempt to stitch the two overlapped images in places that do not include significant local motion. However, experiments have shown that the resulting panorama in this case might still have some stitching artifacts.

Another alternative method is to simply save the whole video sequence, if enough memory resources are available, and then choose the best frames for the panorama later. In this case, one may effectively move back and forth in time, and the best frames will be chosen but not based only on prior frames. Warning the photographer of problems may not be feasible in such an embodiment, versus embodiments of real-time image evaluation.

As used herein, the terms "a" or "an" shall mean one or more than one. The term "plurality" shall mean two or more than two. The term "another" is defined as a second or more. The terms "including" and/or "having" are open ended (e.g., comprising). Reference throughout this document to "one embodiment", "certain embodiments", "an embodiment" or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics may be combined in any suitable manner on one or more embodiments without limitation. The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with the practices of persons skilled in the art of computer programming, embodiments are described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the embodiments are essentially the code segments to perform the necessary tasks. The non-transitory code segments may be stored in a processor readable medium or computer readable medium, which may include any medium that may store or transfer information. Examples of such media include an electronic circuit, a semiconductor memory device, a read-only memory (ROM), a flash memory or other non-volatile memory, a floppy diskette, a CD-ROM, an optical disk, a hard disk, a fiber optic medium, etc. User input may include any combination of a keyboard, mouse, touch screen, voice command input, etc. User input may similarly be used to direct a browser application executing on a user's computing device to one or more network resources, such as web pages, from which computing resources may be accessed. Embodiments may also encompass integrated circuitry including circuit elements capable of performing specific system operations.

While the invention has been described in connection with specific examples and various embodiments, it should be readily understood by those skilled in the art that many modifications and adaptations of the invention described herein are possible without departure from the spirit and scope of the invention as claimed hereinafter. Thus, it is to be clearly understood that this application is made only by way of example and not as a limitation on the scope of the invention claimed below. The description is intended to cover any variations, uses or adaptation of the invention following, in general, the principles of the invention, and including such departures from the present disclosure as come within the known and customary practice within the art to which the invention pertains.

What is claimed is:

1. A method for selecting frames of an image sequence for panoramic stitching that is performed by a hardware processor, comprising:
   for at least some chosen frames of the image sequence, the hardware processor executes software code that performs actions, including:
      evaluating frame overlap constraints between a current chosen frame and a previous chosen frame;
      evaluating frame motion constraints between the current and previous chosen frames, wherein the evaluation includes generating a histogram comprising a plurality of motion vectors for the current chosen frame with respect to the previous chosen frame;
      selectively saving the current chosen frame as being a qualifying frame if the frame overlap constraints and the frame motion constraints are met, wherein a motion vector corresponding to the largest bin the in the histogram is employed in determining if the frame overlap constraints and the frame motion constraints are met; and
      outputting the qualifying frames.

2. The method of claim 1 wherein the method operates in real time.

3. The method of claim 1 wherein all the frames of an image sequence are processed in order.

4. The method of claim 1 wherein the image sequence is processed during image sequence capture.

5. The method of claim 1 wherein the image sequence is processed after image sequence capture.

6. The method of claim 1 wherein the image sequence comprises a set of frames captured in succession.

7. The method of claim 1 wherein the image sequence is one of an uncompressed video sequence and a compressed video sequence.

8. The method of claim 1 wherein the image sequence is acquired by a digital camera during a pan of a target scene.

9. The method of claim 1, further comprising providing a count of frames required for production of a composite panoramic image.

10. The method of claim 1 wherein the frame overlap constraints comprise a specified directional overlap percentage with respect to a previous qualifying frame.

11. The method of claim 1 wherein the frame motion constraints comprise a maximum allowable local motion within a frame overlap region.

12. The method of claim 1 wherein the frame motion constraints are evaluated by:
   performing motion estimation of a current frame with respect to a previous chosen frame;
   dividing overlapping frame regions between the current frame and the previous chosen frame into blocks for subsequent analysis;
   summing the number of pixels in each block having a difference in pixel illumination value for the current frame and the previous chosen frame exceeding a predefined threshold; and
   selectively determining that large local motion violates the frame motion constraints according to the percentage of blocks having pixel sums indicating high illumination value differences.

13. The method of claim 1 wherein a first frame in the image sequence is saved and outputted as a qualifying frame by default.

14. The method of claim 1 further comprising retaining qualifying frames for further use as reference frames during further processing of the image sequence.

15. The method of claim 1 further comprising stitching the outputted frames into a composite panoramic image for at least one of output and storage.

16. The method of claim 1 further comprising downscaling the frames to be processed.

17. The method of claim 1 further comprising cropping the frames to be processed.

18. The method of claim 1 further comprising warning a user if an error condition occurs, including at least one of: the frame motion constraints are violated, the frame overlap constraints are violated, excess camera tilt occurs in any orientation, and insufficient qualifying frames are saved.

19. The method of claim 18 wherein the frame motion constraints are violated by at least one of:
excess local motion, excess panning speed, insufficient panning speed, and excess hand motion drift in a perpendicular direction to a sweep direction.

20. The method of claim 1, wherein frame overlap constraints for two particular frames of the image sequence are evaluated against a predefined overlap margin, and frame motion constraints are evaluated for the two particular frames and at least one additional frame of the image sequence within the predefined overlap margin.

21. A camera that, for at least some chosen frames of an image sequence:
evaluates frame overlap constraints between a current chosen frame and a previous chosen frame;
evaluates frame motion constraints between the current and previous chosen frames, wherein the evaluation includes generating a histogram comprising a plurality of motion vectors for the current chosen frame with respect to the previous chosen frame;
selectively saves the current chosen frame as being a qualifying frame if the frame overlap constraints and the frame motion constraints are met, wherein a motion vector corresponding to the largest bin the in the histogram is employed in determining if the frame overlap constraints and the frame motion constraints are met; and
outputs the qualifying frames.

22. A computer program product comprising a machine-readable medium tangibly embodying non-transitory program instructions thereon that, when executed by the machine, cause the machine to, for at least some chosen frames of an image sequence:
evaluate frame overlap constraints between a current chosen frame and a previous chosen frame;
evaluate frame motion constraints between the current and previous chosen frames, wherein the evaluation includes generating a histogram comprising a plurality of motion vectors for the current chosen frame with respect to the previous chosen frame;
selectively save the current chosen frame as being a qualifying frame if the frame overlap constraints and the frame motion constraints are met, wherein a motion vector corresponding to the largest bin the in the histogram is employed in determining if the frame overlap constraints and the frame motion constraints are met; and
output the qualifying frames.

23. An integrated circuit, comprising:
for at least some chosen frames of an image sequence:
a first circuit element for evaluating frame overlap constraints between a current chosen frame and a previous chosen frame;
a second circuit element for evaluating frame motion constraints between the current and previous chosen frames, wherein the evaluation includes generating a histogram comprising a plurality of motion vectors for the current chosen frame with respect to the previous chosen frame;
a third circuit element for selectively saving the current chosen frame as being a qualifying frame if the frame overlap constraints and the frame local motion constraints are met, wherein a motion vector corresponding to the largest bin the in the histogram is employed in determining if the frame overlap constraints and the frame motion constraints are met; and
a fourth circuit element for outputting the qualifying frames.

24. A system, comprising:
software code stored in an non-transitive storage device, wherein execution of the software code by a hardware processor performs actions, including:
for at least some chosen frames of an image sequence:
means for evaluating frame overlap constraints between a current chosen frame and a previous chosen frame;
means for evaluating frame motion constraints between the current and previous chosen frames, wherein the evaluation includes generating a histogram comprising a plurality of motion vectors for the current chosen frame with respect to the previous chosen frame;
means for selectively saving a current frame as being a qualifying frame if the frame overlap constraints and the frame motion constraints are met, wherein a motion vector corresponding to the largest bin the in the histogram is employed in determining if the frame overlap constraints and the frame motion constraints are met; and
means for outputting the qualifying frames.

25. A method for processing video frames for generation of a panoramic image with a hardware processor that executes software code that performs actions, the method comprising:
capturing a sequence of video frames;
selecting a first video frame from the sequence of video frames;
storing the first video frame in a first memory location;
selecting a second video frame from the sequence of video frames that succeeds the first video frame and that is within a predefined overlap margin with said first video frame;
storing the second video frame in a second memory location;
estimating local motion between the first selected video frame and the second video frame;
selecting a third video frame from the sequence of video frames that succeeds the second video frame and that is within the predefined overlap margin with said first video frame;
estimating local motion between the third selected video frame and the first video frame;
storing the selected third video frame in the second memory location if the local motion estimated for the selected third video frame is smaller than the local motion of the selected second video frame;
repeating selection of the third video frame until the predefined overlap margin is fully consumed, wherein a histogram comprising a plurality of motion vectors is generated for each selected frame with respect to a previously selected frame and wherein a motion vector corresponding to the largest bin in the histogram is employed to determine if the overlap margin is consumed;

stitching the image stored in the first memory location and the image stored in the second memory location into a panoramic image having a minimal distortion caused by overlap margin and local motion there between; and storing the minimally distorted panoramic image in the first memory location for output.

\* \* \* \* \*